United States Patent
Kumar et al.

(10) Patent No.: US 11,855,860 B1
(45) Date of Patent: Dec. 26, 2023

(54) DOMAIN-SPECIFIC GENERATIVE MACHINE LEARNING MODELS

(71) Applicant: BMC Software, Inc., Houston, TX (US)

(72) Inventors: Ajoy Kumar, Santa Clara, CA (US); Himanshu Singhvi, Pune (IN); Priya Saurabh Talwalkar, Pune (IN)

(73) Assignee: BMC Software, Inc., Houston, TX (US)

( * ) Notice: Subject to any disclaimer, the term of this patent is extended or adjusted under 35 U.S.C. 154(b) by 0 days.

(21) Appl. No.: 18/194,204

(22) Filed: Mar. 31, 2023

(51) Int. Cl.
  *H04L 41/5074* (2022.01)
  *H04L 41/16* (2022.01)

(52) U.S. Cl.
  CPC .......... *H04L 41/5074* (2013.01); *H04L 41/16* (2013.01)

(58) Field of Classification Search
  None
  See application file for complete search history.

(56) References Cited

U.S. PATENT DOCUMENTS

| | | | |
|---|---|---|---|
| 9,317,829 B2 * | 4/2016 | Anand | G06F 16/35 |
| 10,140,444 B2 * | 11/2018 | Venkataraman | G06F 21/6218 |
| 11,176,508 B2 * | 11/2021 | Hwang | G06Q 10/06393 |
| 2018/0150555 A1 * | 5/2018 | Karuppasamy | G06Q 10/20 |
| 2020/0202302 A1 * | 6/2020 | Rathod | G06F 18/2135 |
| 2021/0004706 A1 * | 1/2021 | Riddle | G06Q 10/10 |

OTHER PUBLICATIONS

BMC Software: "Learning about Incident Management—Documentation for BMC Helix ITSM: Smart IT 21.05," available online at <https://docs.bmc.com/docs/smartit2105/learning-about-incident-management-1002909060.html>, Mar. 29, 2023, 8 pages.

J. Mathenge, "Incident Management: The Complete Guide," available online at <https://www.bmc.com/blogs/incident-management/>, Mar. 25, 2021, 8 pages.

* cited by examiner

*Primary Examiner* — Backhean Tiv
(74) *Attorney, Agent, or Firm* — Brake Hughes Bellermann LLP

(57) ABSTRACT

A plurality of resolved incident tickets may each include a worklog providing a history of actions taken during attempts to resolve a corresponding resolved incident and a resolution having at least one resolution statement. An iterative processing of the plurality of resolved incident tickets may include processing each resolution statement of the resolution with at least one domain-specific statement classifier specific to the incident domain to either discard or retain a classified resolution statement; processing each retained classified resolution statement in conjunction with the worklog to determine whether to discard or retain the resolved incident; providing an updated resolution for the resolved incident when the resolved incident is retained, and adding the resolved incident with the updated resolution to the processed incident tickets. Then, at least one machine learning model may be trained to process a new incident ticket, using the processed incident tickets.

20 Claims, 10 Drawing Sheets

| Service | Description | Worklog | Resolution |
|---|---|---|---|
| VPN | I cannot connect to VPN from my mac. It works from home but from... | \r\ⱷ-ø-Ω\r\n\nCognitive service management could not find relevant template. To:user@somecompany.com\r\nCC:helpdesk@somecompany.com\r\n\nHi Hello,\r\n\r\n I have tried connecting to VPN from home and i...\r\nsoftware India Pvt. Ltd.\r\nGlobal:+1-111-222-3333\r\nIsrael: 3-44444\r\nUS/Canada:8-5555\r\nIndia:6600\r\nEmail:Helpdesk@somecompany.comuser VPN is failing to Connect\r\n========================\r\nFrom: user<user@somecompany.com>\r\nsent:04-Jan. 2021 20:42\r\nTo: IT-DigitalWorkplace@somecompany.com\r... | Resolution: Restarting windows fixed it. Thank you. If you need any help.... |
| Teams | Teams. Teams crashes on my windows... | ... | X Resolved |
| | ... | | X Cognitive service management could not |

FIG. 5

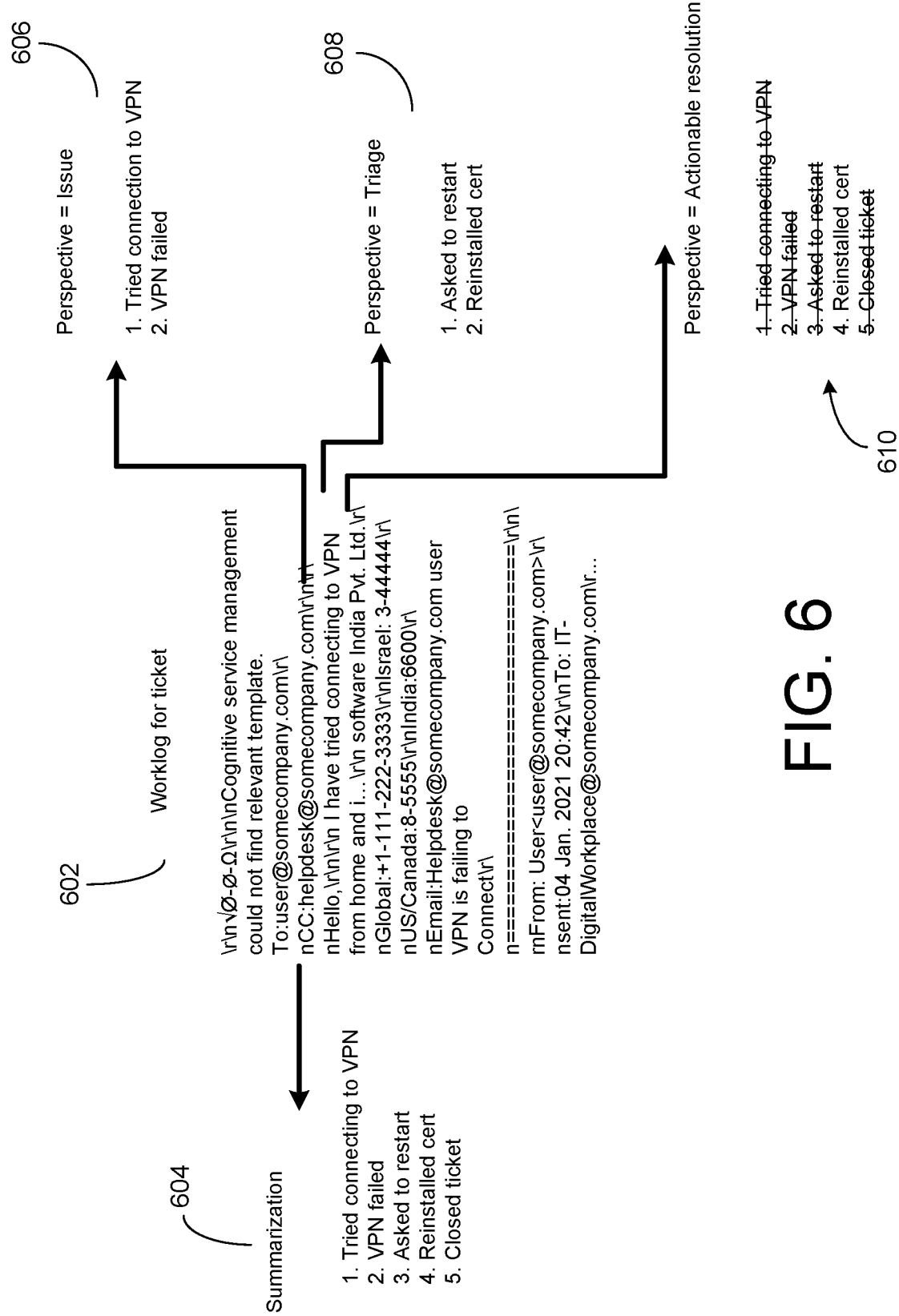

| Description | Detailed description | Context |
|---|---|---|
| VPN issue 1008 | "To: helpdesk@somecompany.com\mCC:\r\n\r\nHi Team,\r\n\r\nNot able to connect to VPN, getting\"""Certificate is invalid for the selected group\""" when BEACON-PC is selected.\r\n\r\nRegards,\r\n_____\r\n\r\n person \r\n\r\nZSO QA CROSS PRODUCT LINE\r\n\r\nDirect\r\n\r\n\r\n+1 111 111 1111\r\n\r\nMobile\r\n\r\n\r\n+1 111-111-1111 (Canada)\r\n\r\n\r\nHome Office\r\n\r\nToronto, Canada\r\n\r\n\r\n[<http://www.somecompany.com/>]\r\n\r\n\r\n\r\n\r 1012 | VPN issue not able connect to, getting "certificate invalid for selected group"BEACON-PC |
| VPN connection issue 1014 | "To: helpdesk@somecompany.com\mCC:\r\n\r\nHello My VPN connection is very unstable. I'm able to connect just fine. After connected, the connection drops, cisco AnyConnect reconnects, and this repeats endlessly. My network connection seems fine otherwise. \r\n\r\n\[cid:image001.png@01D6FFD3.AD52DEC0]\r\n\r\nThanks in advance,\r\n\r\n~Person\r\n\r\n\r\nPerson Person\r\n\r\n\r\n+11 111-111-1111\r\n\r\n\r\nMobile\r\n\r\n\r\n+1 111 111 1111\r\n\r\n\r\nPhoenix, Arizona USA\r\n\r\n\r\n[Communities]<https://communities.com/>\r\n\r\n<https:// software>\r\n\r\n[facebook]<https://software>\r\n\r\n[YouTube]<http://\r\n\r\n<http:// www.company.com/somecompany>\r\n\r\n\r\n\r\n<http:// www.somecompany.com/>\r\n\r\n\r\n\r 1016 | VPN connection unstable able to connect fine and after drops Cisco AnyConnect reconnects 1018 |

FIG. 10

DOMAIN-SPECIFIC GENERATIVE MACHINE LEARNING MODELS

TECHNICAL FIELD

This description relates to generative machine learning (ML) models.

BACKGROUND

ML models have been developed that enable content generation of many different types. For example, some ML models enable chatbots or other software designed to interact with human users in a natural, interactive manner. Some ML models are designed to generate articles, essays, or other compositions, in response to a provided prompt or topic. In other examples, some ML models are designed to provide brief summaries of larger pieces of existing content. Although these and other types of ML models may have wide applicability, it may be difficult to implement many such ML models in the context of specific domains of knowledge.

For example, the domain of Information Technology (IT) incident handling may refer to, or include, structured processes followed by organizations or other entities to restore various IT services to specified operating levels. Attempts to apply general-purpose ML models to the IT incident handling domain, or other specific domain, may result in inaccurate results, or may consume excessive resources to train the ML models. In other examples, general-purpose ML models may simply be unable to provide a type of result that is specific to the domain in question, such as when training data of sufficient quality is not available. For example, in the IT incident handling domain, it may be difficult or impossible for a general-purpose ML model to generate an accurate, actionable resolution for resolving a specific IT incident.

SUMMARY

According to one general aspect, a computer program product may be tangibly embodied on a non-transitory computer-readable storage medium and may include instructions that, when executed by at least one computing device, are configured to cause the at least one computing device to receive a plurality of resolved incident tickets of an incident domain, each resolved incident ticket having a worklog providing a history of actions taken during attempts to resolve a corresponding resolved incident and a resolution having at least one resolution statement for the corresponding resolved incident. When executed by the at least one computing device, the instructions may be further configured to cause the at least one computing device to execute an iterative processing of the plurality of resolved incident tickets to obtain processed incident tickets, including: (a) processing each resolution statement of the resolution with at least one domain-specific statement classifier that is specific to the incident domain to either discard or retain a classified resolution statement, (b) processing each retained classified resolution statement in conjunction with the worklog to determine whether to discard or retain the resolved incident, (c) providing an updated resolution for the resolved incident when the resolved incident is retained, and (d) adding the resolved incident with the updated resolution to the processed incident tickets. When executed by the at least one computing device, the instructions may be further configured to cause the at least one computing device to train at least one machine learning model to process a new incident ticket including generating a new resolution statement using a new worklog of the new incident ticket, using the processed incident tickets.

According to other general aspects, a computer-implemented method may perform the instructions of the computer program product. According to other general aspects, a system may include at least one memory, including instructions, and at least one processor that is operably coupled to the at least one memory and that is arranged and configured to execute instructions that, when executed, cause the at least one processor to perform the instructions of the computer program product and/or the operations of the computer-implemented method.

The details of one or more implementations are set forth in the accompanying drawings and the description below. Other features will be apparent from the description and drawings, and from the claims.

BRIEF DESCRIPTION OF THE DRAWINGS

FIG. 5 illustrates a more detailed example of incident data used in the incident handling system of FIG. 1.

FIG. 6 illustrates an example of a perspective summary generated by the incident handling system of FIG. 1.

FIG. 10 illustrates example processing of incident ticket data for context determination in the example of FIG. 8.

DETAILED DESCRIPTION

Figure 1:
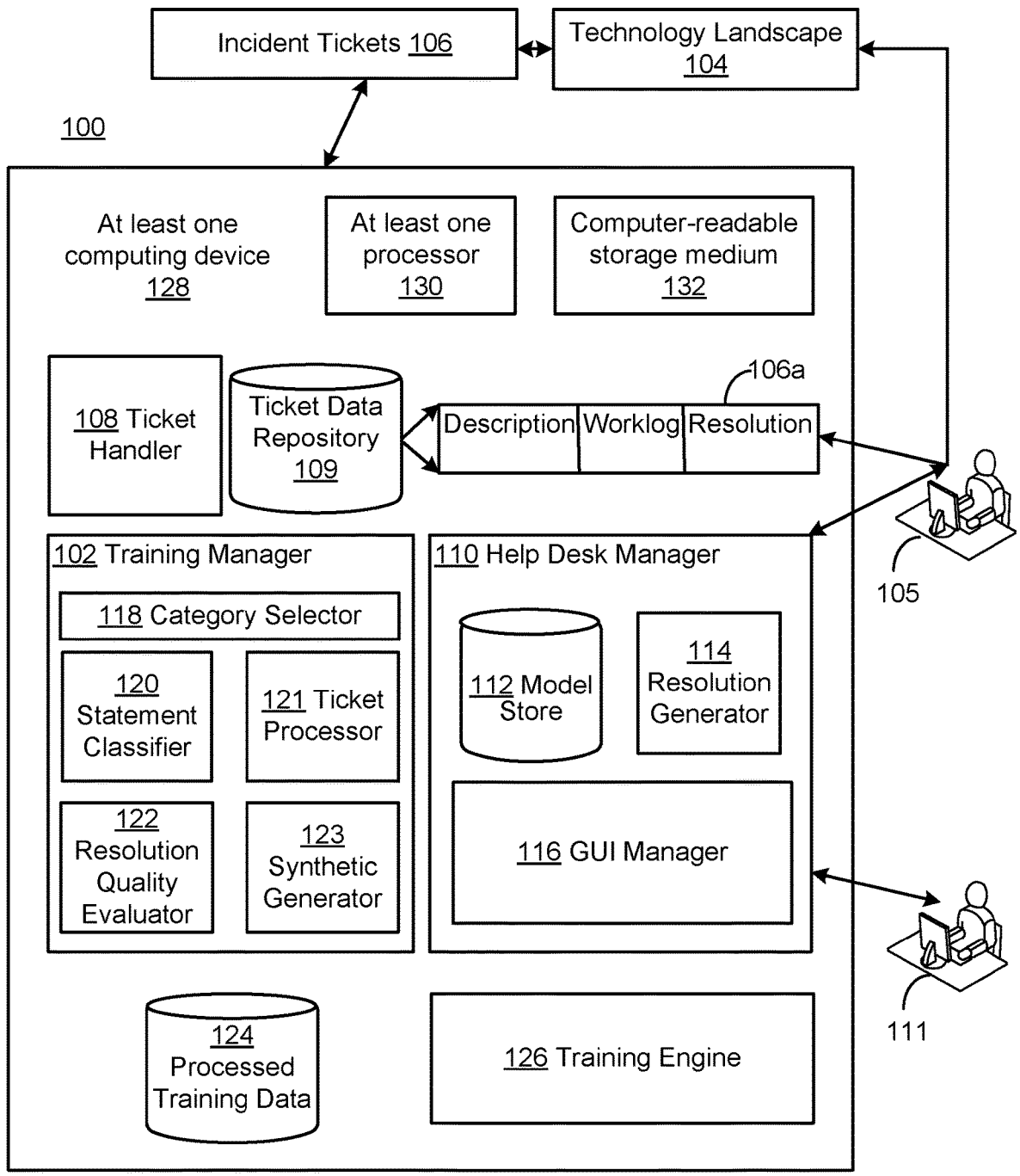
FIG. 1 is a block diagram of an IT incident resolution system using domain-specific machine learning models.

Described systems and techniques provide efficient and effective training of domain-specific or domain-adapted machine learning (ML) models, including large language models (LLMs) used to generate outputs of desired types and quantities of content in response to received inputs. Described techniques increase an accuracy of LLMs within the specified domain, even if original or raw training data is of poor quality.

As referenced above, open-ended or general purpose LLMs attempt to provide many different types of outputs across many different types of input from many different domains. Such general purpose LLMs may be trained using huge quantities of training data.

Advantageously, resulting models are capable of receiving many different types of inputs, and generating many different types of outputs in response. Disadvantageously, general purpose models may consume significant quantities of memory and processing resources to be trained. Moreover, such general-purpose models may not provide desired levels of accuracy in their outputs.

In particular, such general purpose LLMs, trained using general purpose training data, are not capable of providing a desired or necessary level of accuracy within the context of a particular domain. Moreover, within a specific domain, there may not be sufficient high quality, relevant training data to obtain a desired level of accuracy.

In the present description, the term domain refers generally to any designated sphere of activity or knowledge in which a known subset of information can be defined or recognized. Accordingly, many different domains may use, and benefit from, techniques described herein.

For the sake of clarity and conciseness, various examples provided herein relate to an incident handling domain, such as IT incident handling or human resources (HR) incident handling. Other example domains are provided or referenced, as well. However, it will be appreciated that the term domain includes any context within a business, organizational, academic, legal, governmental, technical, or other setting in which a corpus of designated, relevant data is available.

In the example of incident handling, such data may include a volume of previously resolved incident tickets. Although such incident tickets may be specific to the relevant domain of incident handling, the accumulated data may not be of sufficient quality to serve as training data for an incident-handling LLM. For example, such incident ticket data may include large quantities of human-generated text, which may be incomplete and/or inaccurate.

Described techniques process such domain-specific data to obtain a quantity and type of high-quality training data that may then be used to train a domain-specific LLM to perform at an increased level of accuracy within the relevant domain, relative to general-purpose LLMs. Moreover, the quantity and quality of the resulting training data enables such training to be performed quickly and efficiently, with a minimum of memory and processing resources.

FIG. 1 is a block diagram of an incident handling system 100 using domain-specific machine learning models. In FIG. 1, a training manager 102 is configured to provide the type of domain-specific ML training efficiencies just described, to enable accurate generation of incident resolutions even when raw training data is limited or inaccurate, while conserving the use of associated hardware resources needed for performing such training.

In more detail, in FIG. 1, a technology landscape 104 may represent any suitable source of incident tickets 106, submitted by various users represented in FIG. 1 by a user 105, that may be processed by the training manager 102. A ticket handler 108 may be configured to receive the incident tickets 106 over time, in conjunction with handling of the related incidents by a help desk manager 110 and associated incident agent 111. Once resolved by the incident agent 111, the incident tickets 106 may be stored in a ticket data repository 109.

For example, the technology landscape 104 may include many types of network environments, such as network administration of a private network of an enterprise, or an application provided over the public internet or other network. Technology landscape 104 may also represent scenarios in which sensors, such as internet of things devices (IoT), are used to monitor environmental conditions and report on corresponding status information (e.g., with respect to patients in a healthcare setting, working conditions of manufacturing equipment or other types of machinery in many other industrial settings (including the oil, gas, or energy industry), or working conditions of banking equipment, such as automated transaction machines (ATMs)). In some cases, the technology landscape 104 may include, or reference, an individual IT component, such as a laptop or desktop computer or a server. In some embodiments the technology landscape 104 may represent a mainframe computing environment, or any computing environment of an enterprise or organization conducting network-based IT transactions.

The incident tickets 106 may thus represent any tickets related to any incident that may be experienced by the user 105 with respect to any of the various hardware or software components just referenced. In addition, as already noted, the incident tickets 106 may represent incidents occurring in any suitable context other than the technology landscape 104, for which incident resolution may be facilitated by the associated incident agent (111). For example, such incidents may include a HR incident.

FIG. 1 illustrates that an individual incident ticket 106a of the incident tickets 106 may include multiple fields for storing associated types of data. In the example, the incident ticket 106a includes a description field, a worklog filed, and a resolution field, which are thus designated for containing associated types of ticket content for the incident ticket 106a. Although other terminology may be used for such ticket fields, additional or alternative ticket fields may be included as well, as described below. The incident ticket 106a illustrates that ticket content for an individual incident ticket 106a is generally accumulated over time during the lifecycle of the incident ticket 106a in question.

For example, when the incident ticket 106a is first submitted by the user 105, the user 105 may be required to provide content for the description field, to provide context and explanation for the incident the user 105 is experiencing. The description may be brief and/or may be detailed, or there may be separate fields for brief/detailed descriptions.

The worklog field refers to an audit history of actions of, and interactions between, the user 105 and the incident agent 111, during the lifecycle of the incident ticket 106a. The worklog may include attempted resolutions performed by the incident agent 111, messages (e.g., emails or chat messages) between the user 105 and the incident agent 111, or written or auto-transcribed text of audio communications between the user 105 and the incident agent 111. The worklog may also include interactions between the incident agent 111 and other incident agents, or between the incident agent 111 and external sources of potential resolutions for the incident in question, such as knowledge base (KB) articles or various resources available on the internet.

The resolution field is designed and intended to include a resolution of the incident that caused the incident ticket 106a to be generated. For example, the incident agent 111 may be responsible for entering whatever resolution was ultimately responsible for satisfying the user 105 and closing the incident ticket 106a. Once the incident ticket 106a is resolved and closed, the incident ticket 106a may be stored in the ticket data repository 109, as already referenced.

To the extent that the resolution field is required to be filled by a human incident agent 111, it becomes possible that the resolution field will be filled out incorrectly or incompletely. For example, it may occur that the incident agent 111 is required to handle a large volume of the incident tickets 106, perhaps in an overlapping fashion and/or within a relatively short period of time, and perhaps across multiple applications or other use case scenarios. Consequently, once the incident ticket 106a is resolved, the incident agent 111 may be eager to complete the incident ticket 106a and move on to another one of the incident tickets 106.

For these and other reasons, the incident agent 111 may be prone to providing insufficient, incomplete, or incorrect content within the resolution field 106a (resolution content). For example, the incident agent 111 may leave the resolution field blank. Even if the help desk manager 110 implements a requirement for the incident agent 111 to fill out the resolution field, the incident agent 111 may circumvent this requirement by entering some minimum quantity of data, such as "incident resolved," needed to close the incident ticket 106a.

Over a period of time, therefore, the ticket data repository 109 may be filled with individual incident tickets 106a that have the types of insufficient, incomplete, or incorrect resolutions referenced above. Such incident tickets 106a, if used by the training manager 102, are likely to result in correspondingly inaccurate and unhelpful trained MLs.

As described in detail, below, the training manager 102 is configured to process the raw incident ticket 106a data in the ticket data repository 109 to obtain high-quality training data, shown in FIG. 1 as processed training data 124. Consequently, upon training by a training engine 126, the help desk manager 110 may be provided with one or more trained, domain-specific LLMs, shown in FIG. 1 as being stored using a model store 112. Once such domain-specific LLMs have been trained and deployed, a resolution generator 114 may be configured to implement the domain-specific LLMs to assist the user 105 and/or the incident agent 111, e.g., via a graphical user interface (GUI) provided by a GUI manager 116, in processing current and future individual incident tickets 106a of the incident tickets 106.

For example, the user 105 may submit the incident ticket 106a via a suitable GUI, together with a description of the incident in the description field. The user 105 and the incident agent 111 may then work (together or separately) on resolving the incident, while simultaneously compiling corresponding worklog content for the worklog field of the incident ticket 106a. The resolution generator 114 may use a suitable domain-specific model from the model store 112 at any point in the lifecycle of the incident ticket 106a to generate a resolution for the relevant incident.

For example, as described below with respect to FIG. 3, the resolution generator 114 may be capable of generating a potential resolution in response to the description provided by the user 105, i.e., at a beginning of a lifecycle of the incident ticket 106a. As the incident ticket 106a is processed by the incident agent 111 and the worklog content for the worklog field is developed, the developing worklog content may intermittently or continuously be processed by the resolution generator 114 to generate potential resolutions.

In other examples, once a suitable resolution is determined (as judged by the user 105), the resolution generator 114 may generate a suitable summary or representation of the resolution in conjunction with, or following, a closing of the incident ticket 106a. In other words, it may occur that the successful resolution is included in some form within the worklog content of the worklog field, perhaps together with earlier attempted resolutions that were partially or completely unsuccessful. As noted above, conventional techniques simply rely on the incident agent 111 to provide a suitable summary or other representation of the successful resolution, but such approaches are subject to human error. In contrast, by generating a suitable resolution to include in the resolution field of the incident ticket 106a, the resolution generator 114 ensures that the incident ticket 106a includes content that will provide high-quality training data for purposes of continued training or other updates to the domain-specific LLMs of the model store 112.

Thus, as described above, the training manager 102 may be configured to process legacy or historical ticket data within the ticket data repository 109, i.e., raw ticket data in which resolution content (if any) has been provided by human incident agents 111 and not by the resolution generator 114. In this way, the training manager 102 provides high-quality, processed training data 124.

Once sufficient processed training data is available to the training engine 126 and corresponding domain-specific models have been stored in the model store 112, the resolution generator 114 may use such models to generate resolutions for new incident tickets 106a, as just described. The generated resolutions may be moderated by the incident agent 111. Over time, the new incident tickets 106 will therefore include high-quality resolution content to be included in the processed training data 124.

To provide the above and other features, the training manager 102 may be configured to process a determined quantity of incident tickets (e.g., a certain number of rows) of the ticket data repository 109, to obtain the processed training data 124. As described with respect to FIGS. 2 and 8, the training manager 102 may iteratively process each incident ticket 106a using a category selector 118, a statement classifier 120, a ticket processor 121, a resolution quality evaluator 122, and a synthetic generator 123.

In more detail, the category selector 118 may be configured to designate each incident ticket 106a as being included in one of a plurality of domain-specific categories. As described in detail, below, e.g., with respect to FIG. 8, the processed training data 124 may provide better results when processed by the training engine 126 if the processed training data 124 includes training data that is equally or proportionately distributed among a number of relevant domain-specific categories.

For example, in the context of IT incident handling, such categories may refer to, or include a number of primary services within the IT context of the technology landscape 104. In more specific examples, such services in an IT context may include Virtual Private Network (VPN) services, desktop services, and backup services (among others). The contents of the ticket data repository 109 may thus include a number of received incident tickets 106 that is distributed equally (or in some other proportion) among such services. Maintaining the same distribution of categories of incident tickets 106 within the processed training data 124 as exists within the ticket data repository 109 may result in more accurate training of subsequent domain-specific LLMs.

In some implementations, such categories may be explicitly marked or designated for each incident ticket 106a. For example, the user 105 and/or the incident agent 111 may be requested to enter such a designation in conjunction with submitting an incident ticket 106a. In other examples, the category selector 118 may be configured to analyze content of the description field of the incident ticket 106a to determine a category in conjunction with submission of the incident ticket 106a.

For each incident ticket 106a, the statement classifier 120 may be configured to analyze each statement within the worklog and/or description field(s) and determine whether to retain or discard the analyzed statement. In the present description, the term statement should be understood to refer generally to any sentence, phrase, or sentence fragment, which may be as short as one phrase, one word or an abbreviation of a word or phrase and/or which may be separated from adjacent content by any suitable punctuation.

The statement classifier 120 may include two or more separately trained classifiers, where a classifier refers to an algorithm and/or a corresponding trained machine learning model that is trained separately from, or in conjunction with, training processes of the training manager 102. As described in more detail, below, such classifiers are generally trained to sort, order, or categorize data among two or more classes (or types). As such, the one or more classifier models may be trained using one or more separate sources of data than the ticket data repository 109, and may also be trained in conjunction with the data of the ticket data repository 109.

For example, a domain vocabulary or domain ontology may be available that is specific to the domain for which the domain-specific models of the model store 112 are trained. For example, the domain of IT incident handling may have a defined vocabulary or ontology, which may be used to train a classifier of the statement classifier 120 to classify a statement as either being relevant or not relevant to the vocabulary or ontology. In other examples, the ticket data repository 109 may be analyzed to determine, define, or augment the domain vocabulary.

Other examples of classifiers are provided below, e.g., with respect to FIG. 8. In general, such classifiers have the advantage that they may be trained quickly and efficiently, using an existing or easily developed set of training data, which may be relatively small in size, as compared, e.g., to the ticket data repository 109.

Figure 8:
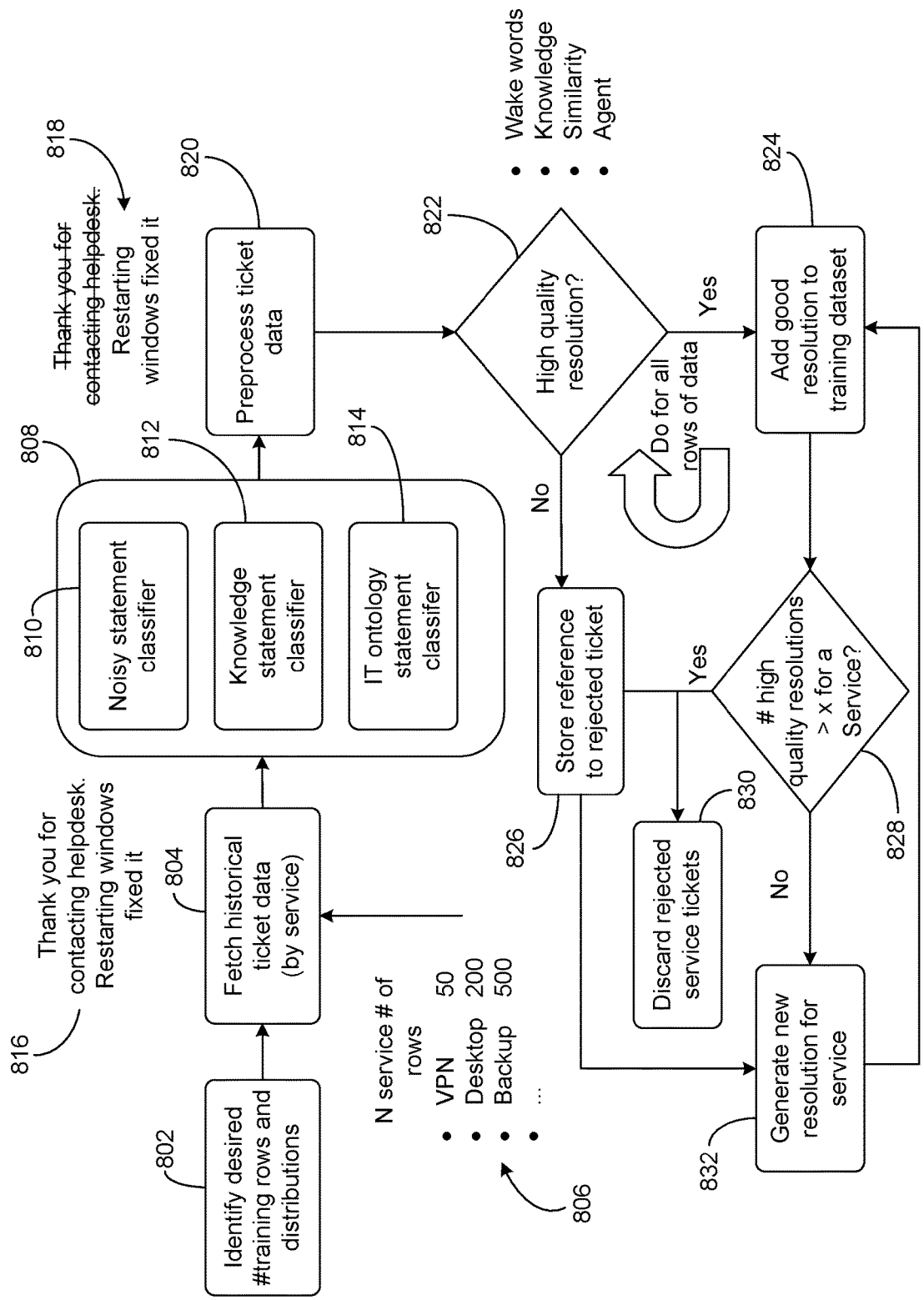
FIG. 8 is a flowchart illustrating more detailed examples of the flowchart of FIG. 2.

Moreover, and as also described with respect to FIG. 8, it is possible to aggregate use of multiple ones of such classifiers, so as to enhance an accuracy and reliability of a resulting aggregated or composite classification. For example, three or more such classifiers may be used to classify each statement of an incident ticket, and an aggregated or composite classification of "retain" or "discard" may be obtained based on corresponding classifications of a majority (e.g., at least two of the three) separate and/or independent classifiers.

The ticket processor 121 may be configured to perform additional processing of each incident ticket 106a to remove either an entire incident ticket 106a or one or more individual tokens that are recognizable based on their content or format. For example, the ticket processor 121 may remove any incident ticket 106a that has a description or resolution having fewer than a minimum threshold number of characters or words and/or greater than a maximum threshold number of characters or words.

The ticket processor 121 may also be configured to remove any personal information of the user 105, such as name, email address, or phone number. The ticket processor 121 may also remove recognized words and punctuation marks, such as salutations, disclaimers, or signatures. Thus, the ticket processor 121 may perform processing as simple as word and character counting, or as complex as having a separately trained natural language processing (NLP) and/or natural language understanding (NLU) model used to recognize and characterize included ticket content.

The resolution quality evaluator 122 may then process remaining incident tickets 106 to determine whether each incident ticket 106a includes a resolution of sufficient quality to retain in the processed training data 124 or not. Multiple techniques for resolution-quality evaluation may be used, as described in more detail, below, e.g., with respect to FIGS. 8 and 9.

For example, the resolution quality evaluator 122 may analyze resolution content of each resolution field to determine whether one or more of a pre-determined number of wake words and/or wake phrases are included therein, where such wake words or wake phrases refer to pre-determined words associated with, or frequently included with, quality resolutions. For example, such wake words may include, e.g., "resolution:", "solution:", or "result:". The resolution quality evaluator 122 may additionally or alternatively examine the worklog content of the worklog field for such wake words and wake phrases, separately or in conjunction with the wake word analysis of the resolution content.

The resolution quality evaluator 122 may also examine worklog and/or resolution content for knowledge words and knowledge content. As referenced above, such knowledge words and knowledge content may refer to or indicate external solution sources that may be used to resolve a corresponding incident. For example, such knowledge content may refer to a KB article or website.

The resolution quality evaluator 122 may also perform, for each relevant incident ticket 106a, a similarity analysis between the worklog content and the resolution content. A high degree of similarity between at least a portion of the resolution content and at least a portion of the worklog content may be indicative of high quality of the resolution content.

In a final example, the resolution quality evaluator 122 may store, or have access to, an agent quality database (not shown separately in FIG. 1) that rates each incident agent 111, using some pre-determined scale or other rating system. Then, if the incident agent 111 has a high rating, the resolution quality evaluator 122 may be more likely to retain a corresponding incident ticket 106a.

The resolution quality evaluator 122 may be further configured to determine whether, during or after resolution quality evaluations, a sufficient number of incident tickets 106 with high-quality resolutions have been retained for inclusion in the processed training data 124. The resolution quality evaluator 122 may determine whether a total number of high-quality incident tickets 106 have been retained, and/or whether a sufficient (e.g., proportional) number of incident tickets 106 for each category of the category selector 118 have been retained.

For example, as referenced above, the category selector 118 may designate categories including VPN, desktop, and backup categories. The category selector 118 may also designate that these three categories occur in equal proportion among the corpus of incident ticket 106 data. However, after the above-described processing of the statement classifier 120, the ticket processor 121, and the resolution quality evaluator 122, it may occur that these proportions are no longer maintained with the resulting or retained incident ticket 106 records. For example, for the sake of simplicity, it may occur that incident tickets 106 in the VPN category are only about half of a number required to maintain the desired equality of proportions between the three categories, VPN, desktop, and backup. Thus, the synthetic generator 123 may be configured to generate a sufficient number of high-quality resolution incident tickets 106 within the VPN category to offset the number of missing or deficient VPN-related incident tickets 106.

Example operations of the synthetic generator 123 are described in more detail, below, e.g., with respect to FIG. 8. In general, in some examples, the synthetic generator 123 may be configured to re-analyze previously discarded or filtered incident tickets in the VPN category that were removed by the statement classifier 120, the ticket processor 121, or the resolution quality evaluator 122, and then use the best-available content of such incident tickets to generate additional content (e.g., resolution content) for these incident tickets 106 to thereby obtain the desired category proportions.

In other examples, the synthetic generator 123 may utilize the high-quality incident tickets in the VPN category that were previously identified by the resolution quality evaluator 122 for inclusion in the processed training data 124. That is, the synthetic generator 123 may use the relevant retained incident tickets to synthetically generate some or all of the remaining desired VPN-related incident tickets 106 needed.

Thus, through the operations of the training manager 102 as described above, and provided in more detail, below, raw incident ticket data in the ticket data repository 109 may be transformed into high-quality training data in the processed training data 124. Consequently, the training engine 126 may be enabled to quickly and efficiently generate one or more domain-specific LLMs for inclusion in the model store 112, so that the help desk manager 110 may be enabled to support the incident agent 111 and otherwise facilitate the providing of desired incident resolutions to the user 105.

In FIG. 1, the training manager 102 is illustrated as being implemented using at least one computing device 128, including at least one processor 130, and a non-transitory computer-readable storage medium 132. That is, the non-transitory computer-readable storage medium 132 may store instructions that, when executed by the at least one processor 130, cause the at least one computing device 128 to provide the functionalities of the training manager 102 and related functionalities.

For example, the at least one computing device 128 may represent one or more servers or mainframes. For example, the at least one computing device 128 may be implemented as two or more servers or virtual machines in a mainframe in communications with one another over a network. Accordingly, the training manager 102, the help desk manager 110, and the training engine 126 may be implemented using separate devices in communication with one another. In other implementations, however, although the training manager 102 is illustrated separately from the help desk manager 110, it will be appreciated that some or all of the respective functionalities of either the training manager 102 or the help desk manager 110 may be implemented partially or completely in the other, or in both.

Figure 2:
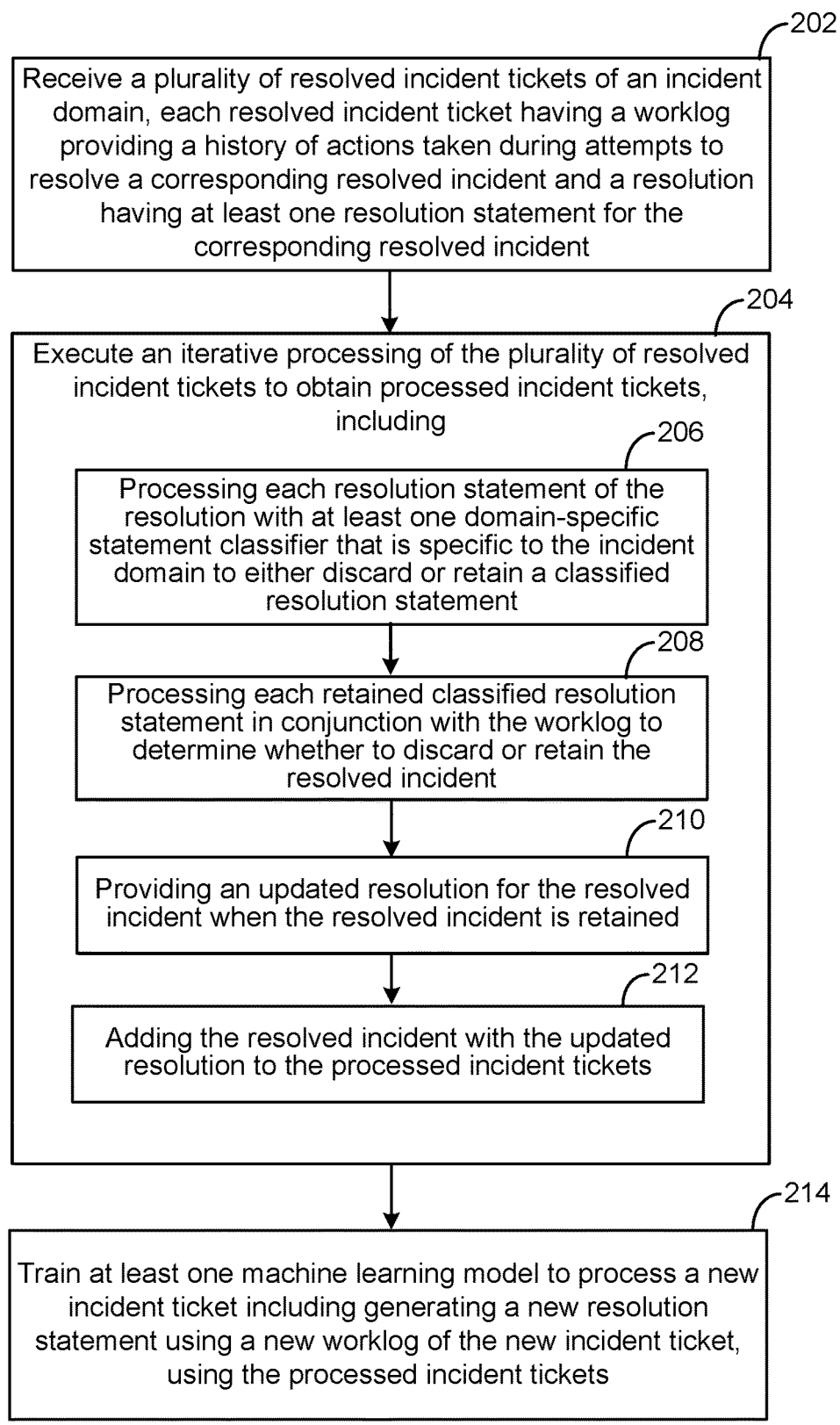
FIG. 2 is a flowchart illustrating example operations of the incident handling system of FIG. 1.

FIG. 2 is a flowchart illustrating example operations of the incident handling system 100 of FIG. 1. In the example of FIG. 2, operations 202 to 214 are illustrated as separate, sequential operations that include an iterative loop. In various implementations, the operations 202 to 214 may include sub-operations, may be performed in a different order, may include alternative or additional operations, or may omit one or more operations.

In FIG. 2, a plurality of resolved incident tickets of an incident domain may be received, each resolved incident ticket having a worklog providing a history of actions taken during attempts to resolve a corresponding resolved incident and a resolution having at least one resolution statement for the corresponding resolved incident (202). For example, the training manager 102 may receive resolved incident tickets 106 from the ticket data repository 109. The incident domain may include IT incidents, HR incidents, or some other specified domain of desired specificity.

An iterative processing of the plurality of resolved incident tickets may be executed to obtain processed incident tickets (204). The iterative processing may include processing each resolution statement of the resolution with at least one domain-specific statement classifier that is specific to the incident domain to either discard or retain a classified resolution statement (206). For example, the statement classifier 120 may include three or more classifiers, such as a noise classifier trained to detect resolution noise, a domain classifier trained to detect whether a resolution statement includes domain-specific vocabulary or ontology, or a knowledge classifier trained to detect whether a resolution statement includes references to KB articles or other knowledge elements.

Each retained classified resolution statement may be processed in conjunction with the worklog to determine whether to discard or retain the resolved incident (208). For example, the resolution quality evaluator 122 may be configured to inspect the resolution statement(s) with respect to the worklog to determine whether one or both include pre-determined wake words or wake phrases that are associated with high-quality resolutions. In other examples, the resolution quality evaluator 122 may perform a similarity analysis to determine that the resolution statement(s) are similar to one or more corresponding statements in the worklog. In still other examples, the resolution quality evaluator 122 may determine whether an incident agent 111 who provided the resolution quality evaluator 122 is rated above a pre-determined threshold associated with retaining a resolution.

An updated resolution for the resolved incident may be provided when the resolved incident is retained (210). For example, in the updated resolution, resolution statements determined to be noise, or determined not to be associated with a wake word or wake phrase, may be eliminated.

The resolved incident with the updated resolution may be added to the processed incident tickets (212). In this way, the processed training data 124 provides high-quality training data that will enable fast, efficient, and accurate training of a domain-specific LLM.

Accordingly, at least one machine learning model may be trained to process a new incident ticket including generating a new resolution statement using a new worklog of the new incident ticket, using the processed incident tickets (214). For example, the training engine 126 may train such a domain-specific LLM to be stored using the model store 112, so that the resolution generator 114 may generate new resolutions when receiving a new incident ticket 106a from the user 105.

Figure 3:
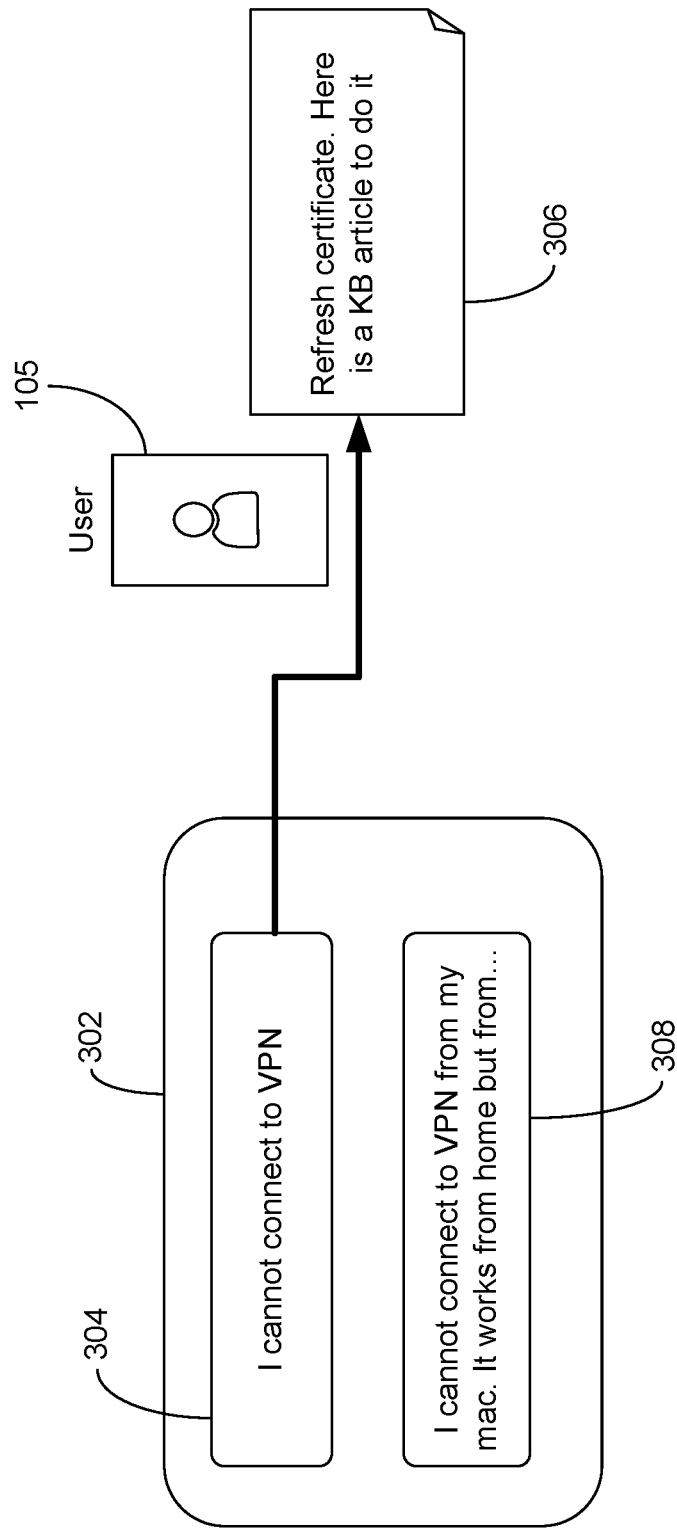
FIG. 3 illustrates a first example context for implementation of the incident handling system of FIG. 1.

FIG. 3 illustrates a first example context for implementation of the incident handling system 100 of FIG. 1. In the example of FIG. 3, the user 105 submits an incident ticket 302 that includes a description 304 of a problem (e.g., "I cannot connect to VPN"), and a more detailed description 308 ("e.g., I cannot connect to VPN from my mac. It works from home but from . . . "). In FIG. 3, in response to the incident ticket 302, the resolution generator 114 generates a resolution 306 (e.g., "Refresh certificate. Here is a KB article to do it.").

That is, the resolution generator 114 may use a domain-specific LLM of the model store 112 to receive the new incident ticket 302 and immediately generate a potential resolution to the user 105. The resolution 306 may be generated in response to the description 304, as shown in FIG. 3, or in response to the detailed description 308. In some implementations, the resolution 306 may be provided as the description 304 is received, and automatically updated as some or all of the detailed description 308 is received.

Accordingly, it may not be necessary for the incident agent 111 to assist with the incident ticket 302. If the generated resolution 306 is used, and the user 105 indicates satisfaction with the result, then the resolution 306 may be stored as part of a resolved incident ticket in the processed training data 124, for future use by the training engine 126.

Figure 4:
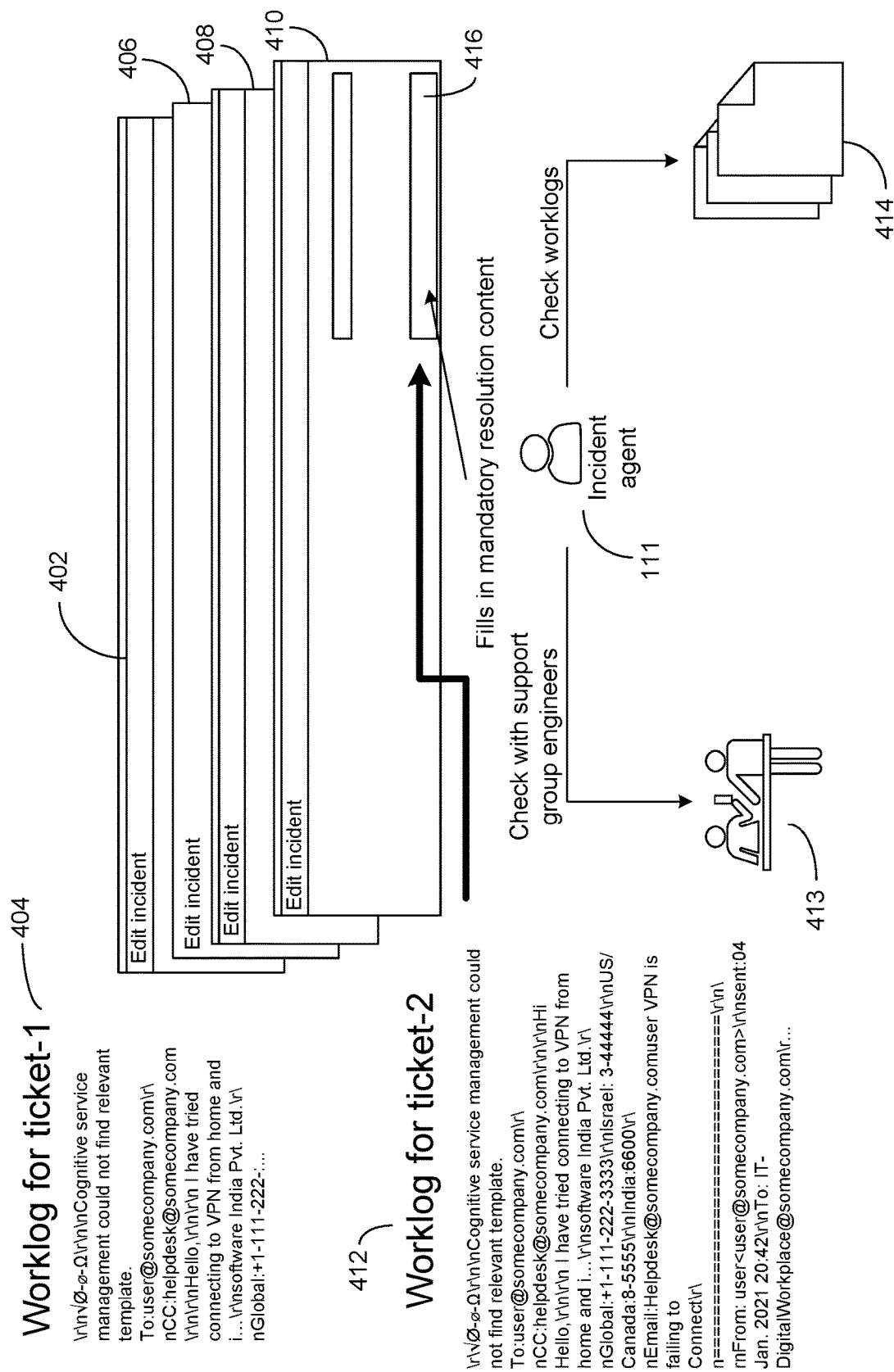
FIG. 4 illustrates a second example context for implementation of the incident handling system of FIG. 1.

FIG. 4 illustrates a second example context for implementation of the incident handling system 100 of FIG. 1. FIG. 4 illustrates a first incident ticket 402 having a corresponding worklog 404. FIG. 4 further illustrates additional incident tickets 406, 408, 410, along with a worklog for ticket-2 (412) corresponding to the incident ticket 410.

The incident agent 111 may be required to handle a large plurality of incident tickets 106, represented by the incident tickets 402, 406, 408, 410 of FIG. 4. For each incident ticket, for example, 410, the incident agent 111 may be required to fill in a resolution field 416 with one or more resolution statements describing actions taken for successful resolution of the incident.

During the process of resolving incident tickets 402, 406, 408, 410, significant worklogs, such as worklogs 404, 412, 414 may be accumulated. Moreover, the incident agent 111 may consult with other incident agents 111 or support group engineers 413 and take various other actions in attempting to reach ticket resolution.

Once resolution is achieved, the incident agent 111 may attempt to complete the mandatory task of filling in the resolution field 416. As noted above, and as represented in FIG. 4, the incident agent 111 likely has a number of parallel or simultaneous incident tickets at various stages of resolution, including newly received tickets for which users are waiting for assistance.

Consequently, it is extremely difficult for the incident agent 111 to take the time to provide a concise and complete resolution statement for the resolution field 416. In conventional systems, the incident agent 111 may simply add a perfunctory remark or other statement to the resolution field (e.g., "resolved"), so as to technically fulfill the requirement to fill in the resolution field. In such circumstances, the techniques of FIGS. 1 and 2 may be used to either discard the incident ticket for purposes of model training or generate a suitable resolution to include in the resolution field 416.

When the incident handling system 100 of FIG. 1 is available, the resolution generator 114 may automatically generate a resolution, similarly to the example of FIG. 3. In such cases, the incident agent 111 may be provided with an actionable resolution, which the incident agent 111 may have the option of moderating or revising. Accordingly, the incident agent 111 may be able to provide faster and more accurate service to a user submitting for example, the incident ticket 410 of FIG. 4 and may be relieved of the responsibility of filling in the incident field 416.

FIG. 5 illustrates a more detailed example of incident data used in the incident handling system of FIG. 1. That is, FIG. 5 illustrates more detailed examples of the incident ticket 106a of FIG. 1, as such incident tickets may be stored in the incident ticket repository 109, and corresponding to examples of FIGS. 3 and 4.

In FIG. 5, a service field 502 provides an example of the type of categories described with respect to the category selector 118 of FIG. 1, where the categories correspond to different types of services handled within the example IT domain. FIG. 5 further includes a description field 504, a worklog field 506, and a resolution field 508.

In the example of FIG. 5, a first row of content represents a first incident ticket, such as the incident ticket 106a of FIG. 1. An example service in the service field 502 is "VPN" 510. Example description text 512 corresponds to the description text 304, 308 of FIG. 3, while example worklog text 514 corresponds to the worklog for ticket-2 (412) of FIG. 4. Example resolution text 516 of "Resolution: Restarting windows fixed it. Thank you. If you need any help, . . . " is included in the resolution field 508.

Remaining rows of the table of FIG. 5 correspond to additional incident tickets 106 and may be iterated through for processing by the training manager 102 as described above with respect to the operations 204-212 of FIG. 2. In particular, resolution text 518 illustrates an example of the type of perfunctory resolution text that may be included by many incident agents 111 in conventional systems. Similarly, the resolution text 516 provides an example of resolution text that includes noise such as statements that are superfluous with respect to actionable resolutions, e.g., "Thank you. If you need any help . . . ". The resolution text 516 also provides an example of a resolution wake word of "Resolution:", as referenced above and described in more detail below, e.g., with respect to FIG. 9.

FIG. 6 illustrates an example of a perspective summary generated by the incident handling system of FIG. 1. In FIG. 6, a worklog for ticket 602, similar to the worklog for ticket-2 (412) of FIG. 4, may be processed by a general purpose LLM to generate a summarization 604 of the worklog content. Such summaries may be useful in some contexts, but are often too generalized to provide the types of information needed in incident handling domain(s).

For example, the summarization 604 of the worklog 602 includes the illustrated summary items of: 1. Tried connecting to VPN, 2. VPN failed, 3. Asked to restart, 4. Reinstalled cert, 5. Closed ticket. Thus, these summary items include failed resolution attempts, successful resolution attempts, and various other actions and interactions of the user and/or the incident agent 111.

FIG. 6 also illustrates examples of perspective summaries 606, 608, 610 that may be generated by training a domain-specific LLM using the processed training data 124, or similarly processed training data. For example, an issue perspective summary 606 provides a focused statement describing the issue or problem being handled. A triage perspective summary 608 provides a focused statement describing an initial approach(es) tried by the incident agent. An actionable resolution perspective summary 610 provides a focused statement describing an action(s) taken that successfully resolved the incident, which in this case was the summary phrase, "4. Reinstalled cert."

In summary of FIGS. 1-6, when an incident is closed by the incident agent 111, the incident agent 111 may be required to enter an actionable resolution for that incident that identifies in a few sentences how the incident ticket 106a was resolved. This resolution data is intended to be used for automation purposes, faster ticket mean-time-to-resolution (MTTR) metrics, as well as other data analytics.

In practice, as described, actionable resolutions are often not entered accurately by incident agents 111, and resulting descriptions or statements of actionable resolutions suffer from various other quality issues. As referenced above, such issues may include failures of the incident agent 111 to correctly recall exact steps taken due to working on multiple tickets at the same time, tendency of the incident agent 111 to copy email or chat transcripts that are not concise and may include failed resolution attempts, or tendency of the incident agent 111 to include noise in the resolution statements, such as, e.g., "." or "fixed" or "resolved" or "see ticket 1234" or boilerplate answers such as "thank you."

Having proper, actionable resolution notes, however, is needed for successful completion of downstream activities. For example, opensource generic LLMs that are available and trained on public datasets fail to generate appropriate actionable resolutions because generated summaries, as described with respect to FIG. 6, are not IT-domain-specific and do not understand IT- or HR-specific terminology and phrases. In particular, generic summarizations are not able to identify actionable resolutions, i.e., actions that succeeded in resolving the issue.

In contrast, described techniques summarize a "perspective" such as actions needed for resolution, and not a pure summary of what happened during an incident lifecycle. Described techniques provide a domain-specific generative model that specifically understands, for example, IT concepts and focuses on generating perspective-based summarizations, which are primarily described as actionable resolutions, but which can include any type of perspective(s) referenced in FIG. 6.

Consequently, incident agents 111 may leverage the power of artificial intelligence (AI) driven resolution generation for IT or HR domain incidents. Thus, described techniques improve the quality of data in the resolution field of an incident 106a, which facilitates and improves future automation of the incident handling system 100 of FIG. 1, reuse of resolutions, and MTTR. Also, described techniques enable automation of an incident closure process, e.g., by using the resolution generator 114 to auto-generate an actionable resolution.

As described with respect to the incident handling system 100 of FIG. 1, simply feeding the conventional noisy ticket data as-is will cause a trained LLM to learn incorrect responses, such as boiler plate sentences. In contrast, described techniques enable a method to create high-quality resolution training data for actionable resolution generation from incident text such as worklogs, e-mail chains, and chatlogs. The result is an industry- and domain-specific LLM, e.g., an IT-domain-specific LLM that provides perspective-based summarizations including automatically generating actionable resolutions. To build such a domain-adapted LLM, described techniques provide high-quality resolution training data, e.g., the processed training data 124. This high-quality resolution training data can then be used to train a LLM with domain adaptation.

Figure 7:
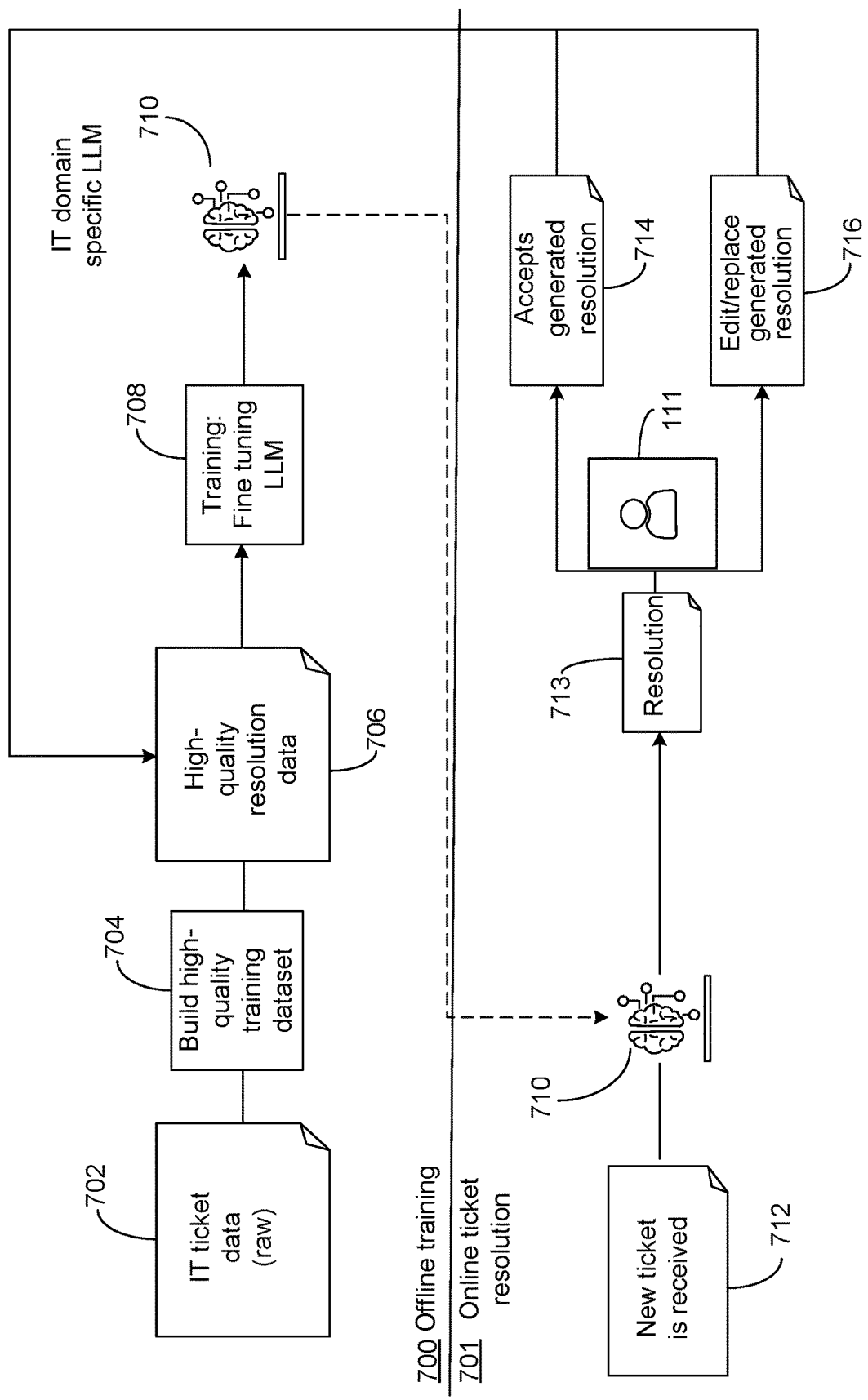
FIG. 7 is a block diagram illustrating a more detailed example implementation of the incident handling system of FIG. 1.

FIG. 7 is a block diagram illustrating a more detailed example implementation of the incident handling system 100 of FIG. 1. As may be understood from the examples of FIG. 1, FIG. 7 includes an upper portion depicting offline training 700, corresponding generally to operations of the training manager 102 and the training engine 126, as well as a lower portion depicting online ticket resolution 701, corresponding generally to operations of the help desk manager 110, including the resolution generator 114.

In the offline training 700, IT ticket data (raw) is identified 702, corresponding to the ticket data repository 109 and/or the example incident ticket 106a data of FIG. 5. For example, a desired number of rows corresponding to a number of incident tickets 106 of the type of table shown in FIG. 5 may be selected, as described in more detail, below, with respect to FIG. 8.

Using the raw IT ticket data (raw) 702, a high-quality training dataset is built 704, and a high-quality resolution data 706 may proceed. For example, as in FIG. 1, the training manager 102 may convert the selected incident ticket 106a data of the ticket data repository 109 into the processed training data 124. Additional or alternative detailed examples of related training data conversion operations are also provided with respect to FIG. 8.

Training: fine tuning LLM 708 of a domain-specific LLM, in the example of FIG. 7, the IT domain specific LLM 710 may then proceed, e.g., using the training engine 126. It will be appreciated from the above description that the high-quality resolution data 706 (or the processed training data 124) may represent a substantially reduced volume of data as compared to the original, IT ticket data (raw) 702. For example, the high-quality resolution data 706 may represent a number of incident tickets in the tens of thousands, whereas the IT ticket data (raw) 702 may include hundreds of thousands or more incident tickets 106, so that the IT domain-specific LLM 710 may be trained much more quickly and efficiently than a general-purpose LLM. Nonetheless, the high-quality resolution data 706 may provide the IT domain-specific LLM 710 that is more accurate in the domain of IT incident handling than general purpose LLMs, as described herein.

Once the domain-specific LLM 710 is deployed, the online ticket resolution 701 may proceed. When a new incident ticket is received 712, the IT domain-specific LLM 710 may proceed to generate a corresponding resolution 713. For example, the IT domain-specific LLM 710 may generate the resolution 713 in response to a description from a user, as in FIG. 3, and/or during development of, or at a completion of, a worklog for ticket-2 (412), as in FIG. 4.

The incident agent 111 may then accept the generated resolution 714, at which point the incident ticket 712 with the generated resolution 714 may be added to the high-quality resolution data 706 to be used in future training: fine tuning LLM 708 operations. Alternatively, the incident agent 111 has the option to edit or replace the generated resolution 716.

In some examples, the incident ticket 712 with the resolution 713 may be included and processed during the subsequent build of the high-quality training dataset 704 to result in high-quality resolution data 706.

FIG. 8 is a flowchart illustrating more detailed examples of the flowchart of FIG. 2. In FIG. 8, a desired number or quantity of training rows of incident data and distributions of services (as categories) are identified (802), and corresponding historical incident ticket data is fetched (by service) (804).

In FIG. 8, a service distribution 806 is illustrated specifying an example distribution that may be interpreted in a simplistic example as representing 50 rows of VPN-related tickets, 200 rows of desktop-related tickets, and 500 rows of backup-related tickets. In other examples, a starting dataset may include, for example, 100,000 records, with Service=VPN having 50K tickets and Service=Teams (Microsoft Teams) having 30,000 tickets. Incident tickets may be clustered within each Service=VPN, Service=Teams to find distinct textual descriptions or resolution fields that identify the variability in resolutions (e.g., VPN service has 20 distinct clusters, Teams service has 60 clusters). Then, to generate a high-quality dataset of, e.g., N=1000 rows, described techniques use the similar approximate proportion of 5,000 resolutions for VPN with 20 distinct resolutions for VPN, and 3,000 Teams resolutions with 60 distinct for Teams, and similarly for other types of services that may be included. As noted above, and described in more detail, below, operations of FIG. 8 may be required to maintain any such desired service distribution of incident tickets 106 within processed incident tickets 106a.

A statement classifier 808, representing an example of the statement classifier 120, is illustrated as including a noisy statement classifier 810, a knowledge statement classifier 812, and an IT ontology statement classifier 814. Other types of classifiers may be used as well. In general, the classifiers 810, 812, 814 represent examples of specific types of classifiers that may be trained quickly and efficiently. Various types of classifiers may be used, including, e.g., decision trees, naïve Bayes classifiers, k-nearest neighbor classifiers, support vector machines, or artificial neural networks. Additionally, few-shot, one-shot, or no-shot training techniques may be used.

The statement classifier 808 may receive each resolution of each received incident ticket and classify each included resolution statement of each resolution. For example, in FIG. 8, an example resolution 816 is illustrated as including resolution text "Thank you for contacting helpdesk. Restarting windows fixed it."

Any single one of the classifiers 810, 812, 814 may be too specific to handle all resolution statements accurately, and/or may not be sufficiently trained to accurately handle all incidents even with respect to classifications for which the model was designed. Nonetheless, by analyzing each resolution statement with the plurality of included classifiers 810, 812, 814, the statement classifier 808 significantly improves a quality of resolutions of the various incident tickets 106a. Moreover, additional or alternative classifiers may be included, as well.

In the example of FIG. 8, the noisy statement classifier 810 may be configured to identify an analyzed statement as being noise or not. Noise in this context may generally include any data or content that limited or no utility with respect to identifying actionable resolution statements. For example, in the example resolution 816, the noisy statement classifier 810 may identify "Thank you for contacting helpdesk" as noise to be removed, to obtain an improved resolution 818 that only includes "Restarting windows fixed it." The noisy statement classifier 810 may be implemented, e.g., using a supervised classifier or a zero-shot classifier.

The knowledge statement classifier 812 may be configured to classify a resolution statement as including a knowledge statement or not. A knowledge statement may include any statement that references or includes external sources of knowledge, such as KB articles, internet content, generative pre-trained transformer (GPT) system, or other LLM system, which may be highly indicative that the statement being considered is pertinent to a resolution, or attempted resolution. For example, the knowledge statement classifier 812 may detect a sentence containing a URL, pdf, text, document, or spreadsheet attachment, or an identifier indicating a KB article such as KB ID. Example sentences that may be detected using the knowledge statement classifier 812 may include, e.g., "You can resolve this issue with KBA502992," or "use attached pdf https:/xyz.com/macorder.pdf to order this accessory." The knowledge statement classifier 812 may be implemented using, e.g., a trained classifier or rules-based classifier.

The IT ontology statement classifier 814 may be configured to analyze each statement with respect to a domain vocabulary and other domain-specific concepts. Similar to the knowledge statement classifier 812, statements that reference or include such IT ontology information may be highly likely to be pertinent to a resolution, or attempted resolution. For example, if a sentence contains an IT-related verb or IT-related noun, the sentence may be classified as an actionable sentence on an IT device. The IT ontology statement classifier may be ontology-driven or a NLP-based classifier.

The various classifiers 810, 812, 814 may be configured to work in concert with one another, so that output of one or more of the classifiers 810, 812, 814 may reinforce a determined classification of one or both of the other classifiers 810, 812, 814. For example, a statement that is determined to be noise by the noisy statement classifier 810, such as the example statement "Thank you for contacting helpdesk", may be unlikely to include either knowledge statements or terms related to the IT ontology.

In other cases, however, the various classifiers 810, 812, 814 may reach differing conclusions regarding a given statement. In such cases, as referenced, the statement classifier 808 as a whole may make a final determination based on findings of a majority of the classifiers 810, 812, 814 (e.g., two of the three).

In some examples, the classifiers 810, 812, 814 may make a binary classification (e.g., "noisy" or "not noisy"). In other examples, the classifiers 810, 812, 814 may determine degrees or likelihoods of classifications, such as "10% likely to be noise" or "90% likely to be a knowledge statement." In such embodiments, a final conclusion of the statement classifier 808 may be based on an aggregation of the individual classifiers 810, 812, 814, with weight given to the various strengths of classifications.

Preprocessing of ticket data 820 may include various steps taken to clean an entirety of an incident ticket 106a, including, e.g., description content, worklog content, and resolution content. As described with respect to the ticket processor 121, such processing may include removal of extraneous or private data. Such processing efforts may also help to determine a context of these fields, including the description field, as described below with respect to FIG. 10.

In more specific examples, a row of incident ticket data may be discarded based on word length characteristics of an included worklog, e.g., a worklog word length of less than 40 words. A row of incident ticket data may also be discarded based on word length characteristics of the included resolution, e.g., a resolution word length of 2 words or less, or a word length more than 10 sentences. Boilerplate or noisy sentences may be detected in the worklog or otherwise within an incident ticket 106a using the noisy statement classifier 810.

Then, iteration over each incident ticket may continue with a determination as to whether a given incident ticket 106a includes a high-quality resolution 822. For example, as referenced above and described in more detail, below, with respect to FIG. 9, wake words or wake phrases may be detected in either the worklog and/or resolution content of an incident ticket 106a. In other examples, a similarity analysis may be performed between the worklog and resolution of an incident ticket 106a. In a final example, resolution quality may be determined based on a quality rating of an incident agent 111 who provided the resolution in question. Resolution quality evaluation examples are provided in more detail, below, with respect to FIG. 9.

Similar to the statement classifier 808, the resolution quality determination 822 may leverage and combine or aggregate multiple ones of these quality determination techniques. For example, different instances of each one may be assigned equal or different strengths and/or weights when making a judgement based on such aggregations.

If a resolution is determined to be high quality, it may be identified and selected as such, and added to the high-quality training dataset being built 824. If the resolution does not meet a quality threshold, the incident ticket 106a may be temporarily rejected, and a reference to the rejected incident ticket may be stored 826 for later processing if needed, as described below.

If a required threshold number of incident tickets 106 with high-quality resolutions has been reached for a particular service (e.g., the VPN service) 828, then previously rejected incident tickets related to that service may be discarded 830. Otherwise, a new resolution may be generated for the service in question 832, and the process may be iterated until a specified threshold has been reached for each service of a desired service distribution.

For example, as described with respect to the synthetic generator 123, a new resolution may be generated from a previously-rejected ticket. In other examples, an alternative version of an incident ticket previously identified as having a high-quality resolution and included in the high-quality training dataset may be synthesized. By generating such additional incident tickets 106a, the desired proportion of services among retained incident tickets may be maintained.

For example, if described processing results in only 30 VPN-related incident tickets being retained when a threshold of 50 has been set, then rejected VPN incident tickets may be selected for which resolutions may be generated, until the threshold is reached. Additionally, or alternatively, accepted VPN incident tickets may be used to synthesize one or more alternate incident tickets.

In more detailed examples, to generate synthetic training data using heuristics, a collection of functions may be defined that input ticket description, ticket worklog, resolution and additional metadata as inputs to synthetically generate a resolution. Such functions may work by using a combination of domain-specific heuristics, e.g., wake words such as "Resolution:" "Fixed:", or a "KB" or "URL" was referenced in a worklog. Sentence(s) in proximity to such wake words may be interpreted as identifying an actionable resolution.

In other examples, ML-based synthetic data generation (e.g., few shot learning techniques may be used to generate a high-quality resolution with variability in verbiage from an underlying incident ticket 106a. For example, a specific requirement may be to generate four pairs of tickets and resolutions on the exact same topic but with different (but still valid) verbiage. For example, input data may include: "ticket—I am a new joiner and would like to install VPN; resolution—For OS—Mac—Install VPN client and enroll Cisco certificate to start using VPN on new machine. For OS—Windows—Install VPN client using this version installer 1.2234."

Then, corresponding synthetically generated pairs may include the following 4 examples: (1) Ticket—I am a new joiner and would like to set up a VPN/Resolution—For Mac users: Install the VPN client and get the Cisco certificate to start using the VPN on your machine. For Windows users: Install the VPN client using the installer version 1.2234; (2) Ticket—I recently joined the company and need help with setting up a VPN/Resolution—If you have a Mac: Install the VPN client and use the Cisco certificate to start using the VPN. For Windows users: Utilize the version 1.2234 installer to get the VPN client up and running; (3) Ticket—I am new here and would like to install a VPN/Resolution—For Mac: Install the VPN client and get the Cisco certificate to get your VPN going. Windows: Use the installer version 1.2234 to get the VPN client; (4) Ticket—I just started and need assistance with installing a VPN/Resolution—Mac users: Install the VPN client and acquire the Cisco certificate to begin using the VPN. For Windows: Download the version 1.2234 installer to set up the VPN client.

To implement the above-described types of synthetic generation, candidate incident-resolution pairs to use may be identified from a cluster of incidents of a relevant service type. For example, some candidate incident-resolution pairs may include the following three examples taken from a VPN cluster of incident tickets: (1) VPN tool is repetitively asking to enter the password/User's password was expired. Guided user to change the password and then VPN connection worked smoothly; (2) Unable to connect to VPN/Cleared the cache folder. Re-enrolled the Cisco certificate. Restarted the machine; (3) VPN installation failed/Installed the VPN client version 1.2 and enrolled the Cisco certificate.

Relevant training data may also be obtained using additional or alternative means. For example, from an incident's rejection phase for a rejected incident, knowledge may be gained with respect to the specific incident's text and its applied resolution, which may then be used as an example pair that is treated as a negative sample pair. These negative samples, which may also be referred to as hard negative samples, may play an important role in training the domain-specific model when using, e.g., a contrastive loss function.

Conversely, when wake words are present in both a worklog and corresponding resolution of an incident ticket, described techniques may make a copy of this training row by removing the wake words in either and/or both of a source (e.g., worklog) and in the resolution. The modified incident ticket may then be included in the processed, high-quality training data. This technique may be referred to as generating hard positive resolutions, and may also be used to improve learning of the model being trained.

Thus, described techniques may determine high-quality resolutions to include within a high-quality training dataset. Described techniques may update or replace an existing resolution, and/or may build a new column that holds actionable resolutions of high quality that can be used for training or fine tuning a domain-specific LLM.

Figure 9:
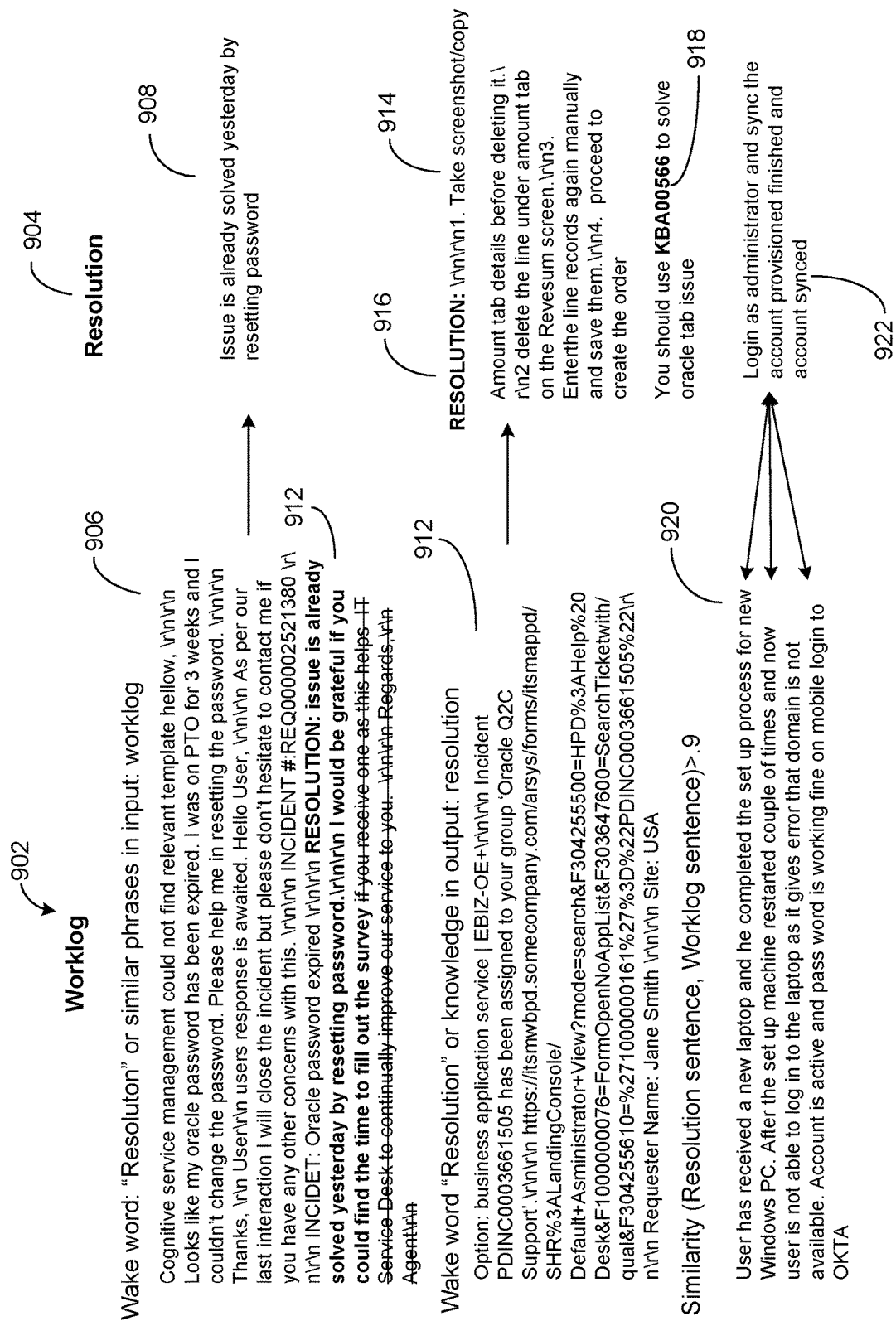
FIG. 9 illustrates example techniques for judging an output quality of processed training data in the example of FIG. 8.

FIG. 9 illustrates example techniques for judging an output quality of processed training data in the example of FIG. 8. In the example of FIG. 9, examples worklogs 902 and resolutions 904 are illustrated. In a first example worklog 906, a wake word "resolution" is detected. A corresponding resolution 908 does not include the wake word. In a similar example worklog 912, no wake word is included, but a corresponding resolution 914 incudes wake word 916 of "resolution." An example KB wake word 918 of KBA00566 is also illustrated. Thus, and as described above, wake words or wake phrases may be used to identify high-quality resolutions.

When no wake word or wake phrase is present, as in an example worklog 920 and corresponding resolution 922, a similarity analysis may be performed to determine whether each/any sentence in the resolution 922 is sufficiently similar to at least one sentence in the corresponding worklog 920. For example, a semantic similarity analysis may be performed, and a corresponding similarity threshold may be set. For example, a similarity algorithm(s) such as the cosine similarity algorithm and/or word2vec, or other suitable similarity algorithm, may be used.

FIG. 10 illustrates example processing of incident ticket data for context determination in the example of FIG. 8. In FIG. 10, a description column 1002, detailed description column 1004, and context column 1006 are illustrated. A first description 1008 of "VPN issue" is associated with a detailed description 1010 that includes various types of extraneous and non-contextual information, which may include personal email addresses or other personal information, various delimiters, and other types of information that is non-contextual with respect to an actual description of a corresponding issue (e.g., "VPN issue"). Similar comments apply to separate description 1014 of "VPN connection issue" and corresponding detailed description 1016.

To obtain corresponding context content 1012 and 1018, each corresponding description and detailed description may be processed by a NLP model. Then, the types of extraneous information referenced above, including signatures, URLs, hostnames, disclaimers, salutations, and any type of personal information may be extracted. A natural language understanding model may then be used to generate the context content 1012, 1018.

By working from context 1012, 1018, rather than an underlying description or detailed description, the above-described techniques for judging resolution quality and synthetically generating resolutions may be facilitated. Moreover, described techniques enable automation and reuse of incident resolutions to improve MTTR, as well as automation of incident closure processes. Efficiency and quality of incident agents' 111 work may be improved, as resolutions may be generated that are high quality and consistent for all incident agents 111.

Implementations of the various techniques described herein may be implemented in digital electronic circuitry, or in computer hardware, firmware, software, or in combinations of them. Implementations may be implemented as a computer program product, i.e., a computer program tangibly embodied in an information carrier, e.g., in a machine-readable storage device, for execution by, or to control the operation of, data processing apparatuses, e.g., a programmable processor, a computer, a server, multiple computers or servers, mainframe computer(s), or other kind(s) of digital computer(s). A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be executed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the execution of a computer program include, by way of example, both general and special purpose microprocessors and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by or incorporated in special purpose logic circuitry.

To provide for interaction with a user, implementations may be implemented on a computer having a display device, e.g., a cathode ray tube (CRT) or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

While certain features of the described implementations have been illustrated as described herein, many modifications, substitutions, changes, and equivalents will now occur to those skilled in the art. It is, therefore, to be understood that the appended claims are intended to cover all such modifications and changes as fall within the scope of the embodiments.

What is claimed is:

1. A computer program product, the computer program product being tangibly embodied on a non-transitory computer-readable storage medium and comprising instructions that, when executed by at least one computing device, are configured to cause the at least one computing device to:
   receive a plurality of resolved incident tickets of an incident domain, each resolved incident ticket having a worklog providing a history of actions taken during attempts to resolve a corresponding resolved incident and a resolution having at least one resolution statement for the corresponding resolved incident;
   execute an iterative processing of the plurality of resolved incident tickets to obtain processed incident tickets, including:
   (a) processing each resolution statement of the resolution with at least one domain-specific statement classifier that is specific to the incident domain to either discard or retain a classified resolution statement,
   (b) processing each retained classified resolution statement in conjunction with the worklog to determine whether to discard or retain the resolved incident,
   (c) providing an updated resolution for the resolved incident when the resolved incident is retained, and
   (d) adding the resolved incident with the updated resolution to the processed incident tickets; and
   train at least one machine learning model to process a new incident ticket including generating a new resolution statement using a new worklog of the new incident ticket, using the processed incident tickets.

2. The computer program product of claim 1, wherein the at least one machine learning model includes a domain-specific large language model (LLM).

3. The computer program product of claim 1, wherein the at least one domain-specific statement classifier includes a noisy statement classifier configured to classify each resolution statement as noise with respect to the incident domain.

4. The computer program product of claim 1, wherein the at least one domain-specific statement classifier includes a knowledge base classifier configured to classify each resolution statement as referencing a knowledge base for the incident domain.

5. The computer program product of claim 1, wherein the at least one domain-specific statement classifier includes a domain ontology classifier configured to classify each resolution statement as including domain vocabulary for the incident domain.

6. The computer program product of claim 1, wherein the instructions, when executed, are further configured to cause the at least one computing device to:
determine whether to discard or retain the resolved incident by inspecting each retained classified resolution statement for inclusion of a resolution wake word.

7. The computer program product of claim 1, wherein the instructions, when executed, are further configured to cause the at least one computing device to:
determine whether to discard or retain the resolved incident by inspecting the worklog for inclusion of a resolution wake word.

8. The computer program product of claim 1, wherein the instructions, when executed, are further configured to cause the at least one computing device to:
determine whether to discard or retain the resolved incident by determining a similarity level between the retained classified resolution statement and at least one worklog statement of the worklog.

9. The computer program product of claim 1, wherein the instructions, when executed, are further configured to cause the at least one computing device to:
determine whether to discard or retain the resolved incident based on an incident agent quality rating of an incident agent associated with the resolved incident ticket.

10. The computer program product of claim 1, wherein the instructions, when executed, are further configured to cause the at least one computing device to:
determine that a quantity of retained incident tickets with updated resolutions is below a threshold;
synthetically generate at least one additional resolved incident ticket using at least one of a discarded incident ticket or a retained incident ticket; and
include the at least one additional resolved incident ticket in the processed incident tickets.

11. A computer-implemented method, the method comprising:
receiving a plurality of resolved incident tickets of an incident domain, each resolved incident ticket having a worklog providing a history of actions taken during attempts to resolve a corresponding resolved incident and a resolution having at least one resolution statement for the corresponding resolved incident;
executing an iterative processing of the plurality of resolved incident tickets to obtain processed incident tickets, including:
(a) processing each resolution statement of the resolution with at least one domain-specific statement classifier that is specific to the incident domain to either discard or retain a classified resolution statement,
(b) processing each retained classified resolution statement in conjunction with the worklog to determine whether to discard or retain the resolved incident,
(c) providing an updated resolution for the resolved incident when the resolved incident is retained, and
(d) adding the resolved incident with the updated resolution to the processed incident tickets; and training at least one machine learning model to process a new incident ticket including generating a new resolution statement using a new worklog of the new incident ticket, using the processed incident tickets.

12. The method of claim 11, wherein the at least one machine learning model includes a domain-specific large language model (LLM).

13. The method of claim 11, wherein the at least one domain-specific statement classifier includes at least one of: a noisy statement classifier configured to classify each resolution statement as noise with respect to the incident domain, a knowledge base classifier configured to classify each resolution statement as referencing a knowledge base for the incident domain, and a domain ontology classifier configured to classify each resolution statement as including domain vocabulary for the incident domain.

14. The method of claim 11, further comprising:
determining whether to discard or retain the resolved incident by inspecting each retained classified resolution statement and the worklog for inclusion of a resolution wake word.

15. The method of claim 11, further comprising:
determining whether to discard or retain the resolved incident by determining a similarity level between the retained classified resolution statement and at least one worklog statement of the worklog.

16. The method of claim 11, further comprising:
determining that a quantity of retained incident tickets with updated resolutions is below a threshold;
synthetically generating at least one additional resolved incident ticket using at least one of a discarded incident ticket or a retained incident ticket; and
including the at least one additional resolved incident ticket in the processed incident tickets.

17. A system comprising:
at least one memory including instructions; and
at least one processor that is operably coupled to the at least one memory and that is arranged and configured to execute instructions that, when executed, cause the at least one processor to:
receive a plurality of resolved incident tickets of an incident domain, each resolved incident ticket having a worklog providing a history of actions taken during attempts to resolve a corresponding resolved incident and a resolution having at least one resolution statement for the corresponding resolved incident;
execute an iterative processing of the plurality of resolved incident tickets to obtain processed incident tickets, including:
(a) processing each resolution statement of the resolution with at least one domain-specific statement classifier that is specific to the incident domain to either discard or retain a classified resolution statement,
(b) processing each retained classified resolution statement in conjunction with the worklog to determine whether to discard or retain the resolved incident,
(c) providing an updated resolution for the resolved incident when the resolved incident is retained, and
(d) adding the resolved incident with the updated resolution to the processed incident tickets; and
train at least one machine learning model to process a new incident ticket including generating a new resolution statement using a new worklog of the new incident ticket, using the processed incident tickets.

18. The system of claim 17, wherein the at least one domain-specific statement classifier includes at least one of:

a noisy statement classifier configured to classify each resolution statement as noise with respect to the incident domain, a knowledge base classifier configured to classify each resolution statement as referencing a knowledge base for the incident domain, and a domain ontology classifier configured to classify each resolution statement as including domain vocabulary for the incident domain.

19. The system of claim 17, wherein the instructions, when executed, are further configured to cause the at least one processor to:
   determine whether to discard or retain the resolved incident by inspecting each retained classified resolution statement and the worklog for inclusion of a resolution wake word.

20. The system of claim 17, wherein the instructions, when executed, are further configured to cause the at least one processor to:
   determine that a quantity of retained incident tickets with updated resolutions is below a threshold;
   synthetically generate at least one additional resolved incident ticket using at least one of a discarded incident ticket or a retained incident ticket; and
   include the at least one additional resolved incident ticket in the processed incident tickets.

* * * * *